United States Patent [19]

Severinsson

[11] Patent Number: 5,410,911
[45] Date of Patent: May 2, 1995

[54] LOAD CELL AND A BRAKE ARRANGEMENT PROVIDED THEREWITH

[75] Inventor: Lars M. Severinsson, Hishult, Sweden

[73] Assignee: Sab Wabco Holdings BV, Netherlands

[21] Appl. No.: 94,190

[22] PCT Filed: Feb. 17, 1992

[86] PCT No.: PCT/SE92/00096

§ 371 Date: Aug. 2, 1993

§ 102(e) Date: Aug. 2, 1993

[87] PCT Pub. No.: WO92/15000

PCT Pub. Date: Sep. 3, 1992

[30] Foreign Application Priority Data

Feb. 18, 1991 [SE] Sweden .................................. 9100470

[51] Int. Cl.$^6$ .............................................. G01L 5/28
[52] U.S. Cl. .................................. 73/128; 73/862.642
[58] Field of Search ............... 73/862.381, 862.392, 73/862.393, 862.581, 862.584, 862.621, 862.625, 862.636, 862.642, 121, 128, 129, 132, 862.541, 862.56, 862.57, 862.542; 188/1.11, 34

[56] References Cited

U.S. PATENT DOCUMENTS

| 2,063,244 | 12/1936 | Gulliver | 73/129 |
| 5,036,714 | 8/1991 | Christoffers et al. | 73/862.642 |
| 5,038,605 | 8/1991 | Tews et al. | 73/862.581 |

FOREIGN PATENT DOCUMENTS 251875  9/1969  U.S.S.R. .................. 73/862.621

Primary Examiner—Robert Raevis
Attorney, Agent, or Firm—Laurence R. Brown

[57] ABSTRACT

A load cell for transmitting a signal depending on the force exerted thereon has an elastic element in the form of a rubber sleeve (11), which is in contact with a pressure transducer (14) and is enclosed in an annular compartment formed by an annular recess in a housing (2) and a corresponding recess in a rod (6), that is exposed to the force and extends into the housing. A ring (10, 12) is arranged at each end of the rubber sleeve to transmit forces in the two axial directions of the rod to the sleeve from the respective end shoulders (2', 3', 8', 9') of the recesses 6 Claims, 2 Drawing Sheets

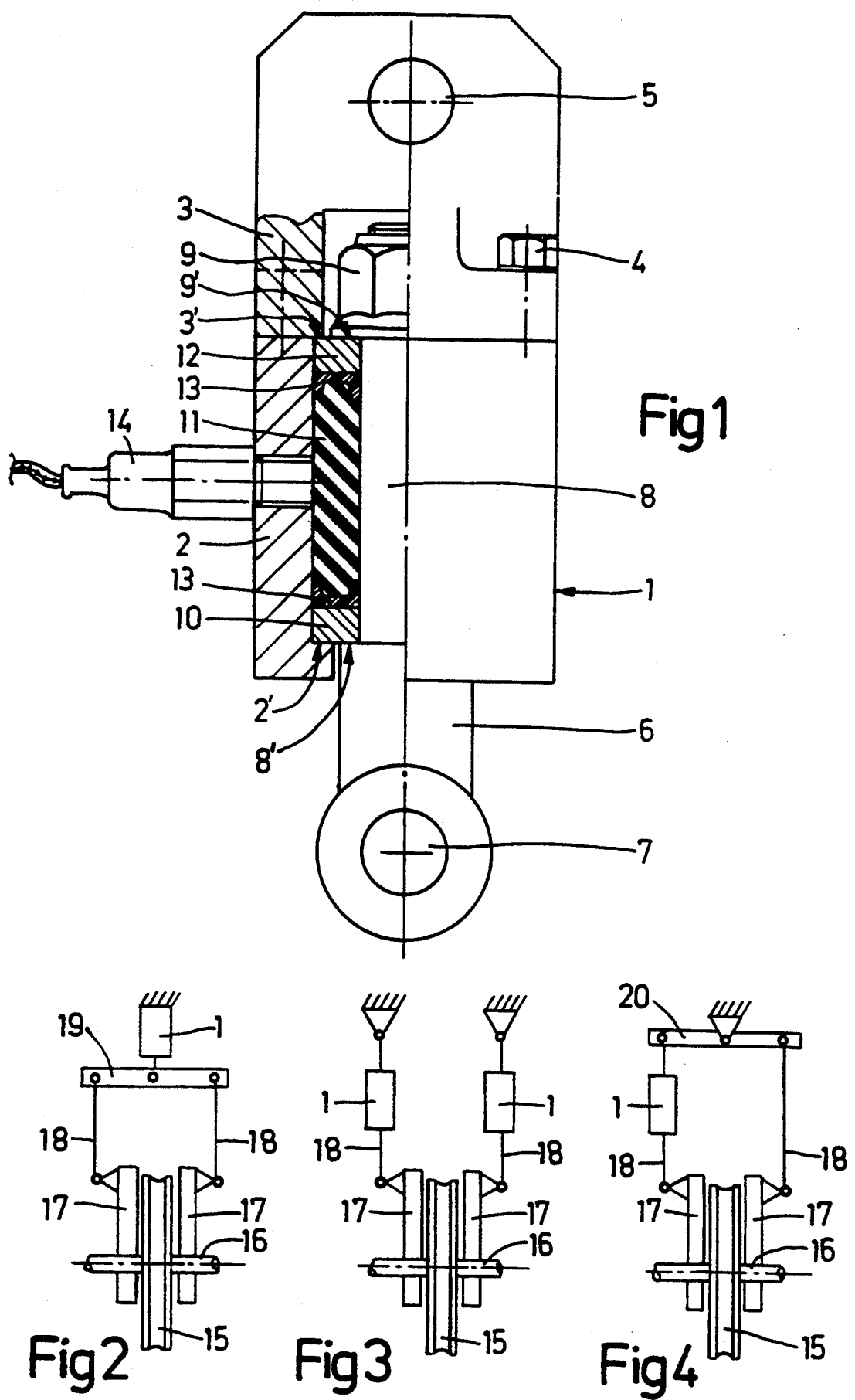

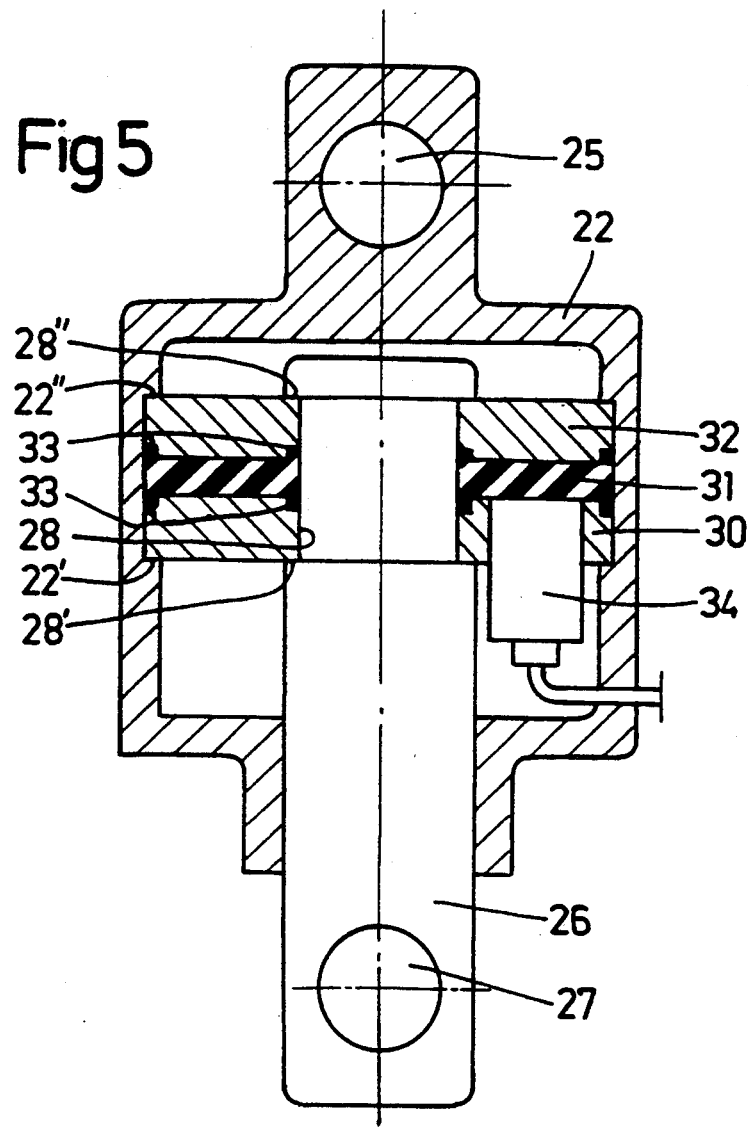

LOAD CELL AND A BRAKE ARRANGEMENT PROVIDED THEREWITH

This application is a 371 of PCT/SE92/00096 filed Feb. 17, 1992.

TECHNICAL FIELD

This invention relates to a load cell for transmitting a signal depending on the force exerted thereon, comprising a housing, a rod, which is exposed to said force and extends into said housing, an elastic element between the housing and the rod, and a pressure responsive device for sensing the pressure in the elastic element and creating said signal. The invention also relates to the use of this load cell at a brake arrangement, especially but not exclusively for a rail vehicle.

TECHNICAL BACKGROUND

Load cells of the general type defined above are known in the art. One example is shown and described in EP-A-402 261. This load cell device has a plate-shaped chamber, which is filled with liquid but equally well could be filled with a silicon rubber disc or the like for transmitting a force to a piston of a pneumatic valve device for delivering a pneumatic signal depending on the force exerted on the liquid or disc. The internal arrangement of the device for exerting a compression force on the liquid or disc irrespective of whether the external force is pushing or pulling is comparatively complex and accordingly expensive and sensitive to disturbances.

Another similar device for measuring an axial force in either direction in a shaft is shown in EP-A-373 334, but here two separate elastic elements and pressure responsive devices (pressure transducers) are utilized for the two force directions, which is a complication.

A load cell of the type concerned may be used in many applications where a signal depending on a load or force is desirable, and no limitation of the present invention in this respect is intended.

However, the main purpose for the load cell according to the invention is to transmit a signal depending on the tangential brake force obtained in a brake arrangement, preferably at a rail vehicle, so that the brake force applied may be continuously or intermittently adopted to obtain a desired brake characteristic. In this way a feedback control system can be attained, which is of growing importance at modern rail vehicles.

THE INVENTION

A simple and reliable load cell of the type concerned, where signals related to both pushing and pulling forces may be transmitted, is according to the invention obtained in that the elastic element in the form of a rubber sleeve or disc is enclosed in an annular compartment formed by an annular recess in the housing and a corresponding recess in the rod and in that a ring is arranged at each end of the rubber sleeve or disc to transmit forces in the two axial directions of the rod to the rubber sleeve or disc from the respective end shoulders of the recess.

In a brake arrangement, either a block brake or disc brake, preferably for a rail vehicle, where a brake block or pad is brakingly applied against a wheel or disc, a load cell according to the invention may be mounted as a force transmitting element in the suspension means for the block or pad. In this way the tangential brake force (in either direction) in the wheel or disc may be measured, so that a certain force from a brake cylinder may be applied in order to give a certain tangential brake force.

BRIEF DESCRIPTION OF THE DRAWING

The invention will be described in further detail below reference being made to the accompanying drawings, in which FIG. 1 is a partly sectional side view of a first embodiment of a load cell according to the invention, FIGS. 2–4 are schetches to illustrate the use of load cells according to the invention in disc brake arrangements, and FIG. 5 is a partly sectional view of a second embodiment of a load cell according to the invention.

DETAILED DESCRIPTION OF PREFERRED EMBODIMENTS

A load cell 1 (as shown in FIG. 1) has a housing 2 (which may be cylindrical) and a cover 3 attached thereto by means of screws 4. The cover 3 is provided with an attachment hole 5.

The housing 2 has an inner, preferably cylindrical recess, which at its lower end is limited by a housing shoulder 2' and at its upper end by a cover shoulder 3'. Centrally in the housing there is arranged a rod 6, which extends out of the housing 2 downwards and is provided with an ear having an attachment hole 7. Corresponding to the housing recess, the rod 6 has a narrower cylindrical portion 8, which at its lower end is limited by a shoulder 8'. At its upper end the rod 6 is provided with a nut 9, whose lower end 9' is at the same level as the cover shoulder 3' and forms an upper shoulder for the portion 8.

In the annular compartment formed by the housing 2 and the rod portion 8 and limited by the mentioned shoulders 2', 8', 3' and 9' there is arranged an annular unit comprising a lower ring 10, an elastic element in the form of a rubber sleeve 11 and an upper ring 12. The rubber sleeve 11 is preferably made of silicon rubber, but other similar materials are also possible. At its two ends the rubber sleeve 11 is provided with sealing and guiding rings 13, for example made of Teflon ®.

A pressure transducer 14 is arranged in the housing wall in contact with the rubber sleeve 11. In the shown case the transducer is emitting an electrical signal depending on the pressure exerted on its end, but it can equally well be a pneumatic device emitting a pneumatic signal.

Based on the assumption that the housing 2 is fixed, an axial pulling or pushing force in the rod 6 will result in an increased pressure in the rubber sleeve 11. If the rod 6 is pulled out of the housing 2, the nut shoulder 9' pulls the upper ring 12 downwards, so that the rubber sleeve 11—supported by the lower ring 10 on the housing shoulder 2'—is compressed. Similarly, if the rod 6 is pushed into the housing 2, the shoulder 8' pushes the lower ring 10 upwards, so that the rubber sleeve 11—supported by the upper ring 12 on the cover shoulder 9'—is compressed. In the shown design a certain force, irrespective of whether it is pulling or pushing, gives a certain compression of the rubber sleeve 11 and accordingly a certain signal from the pressure transducer 14. It is, however, possible to arrange for different pressures in different directions.

The load cell is primarily intended for determining the attained brake force at disc brakes, and its use for that purpose will now be described. However, it may equally well be used in any instance where the magnitude of a force is to be determined and a corresponding signal emitted. It is to be noted that the design of the load cell is such that the entire force may be handled thereby.

FIGS. 2–4 show three slightly different disc brake arrangements in a simplified fashion. In all the arrangements a brake disc is designated 15 and its shaft 16. Pads to be applied against the discs are designated 17. As is well known in the art there is a brake actuator or brake unit (not shown) to exert a braking force via the brake pads 17 on the actual disc 15, and there are hangers 18 to suspend the pads 17 from a chassis of the vehicle on which the disc brake arrangement is provided.

In the arrangement according to FIG. 2 the hangers 18 are suspended from a lever 19, which in turn is suspended from the chassis by means of a load cell 1 according to the invention. When the brake pads 17 are brakingly applied against the rotating disc 15, the substantially tangential reaction force will be transmitted through the hangers 18, the lever 19 and the load cell 1. Depending on the rotation direction of the disc 15, this force will be pulling or pushing. The signal transmitted from the pressure transducer of the load cell 1 is proportional to the brake force on the disc 15 at any time and can be used in the control of the disc brake actuator for obtaining a feedback control system.

In the arrangement according to FIG. 3 there is a load cell 1 in each hanger 18, which gives a more detailed information but is more expensive.

The arrangement according to FIG. 4 has similarities with the one in FIG. 2, but here the load cell 1 is arranged in one of the hangers 18, which both are connected to a lever 20 attached to the chassis.

A second embodiment of a load cell according to the invention is shown in FIG. 5. The main difference in relation to the embodiment shown in FIG. 1 is the shape of the elastic element, which here is more a disc than a sleeve. As far as possible the numerals of FIG. 1 with the addition of 20 have been used for corresponding parts in FIG. 5.

A load cell housing 22 is provided with an attachment hole 25. It has an inner, preferably cylindrical recess, which is limited by a lower shoulder 22' and an upper shoulder 22''. A rod 26 extends downwards out of the housing 22 and is provided with an attachment hole 27. Corresponding to the housing recess, the rod 26 has a narrower cylindrical portion 28, which is limited by a lower shoulder 28' and an upper shoulder 28''. The respective shoulders of the housing and the rod are at the same height.

In the annular compartment formed by the housing 22 and the rod portion 28 and limited by the mentioned shoulders 22', 28', 22'' and 28'' there is arranged an annular unit comprising a lower ring 30, an elastic element in the form of a rubber disc 31 and an upper ring 32. Sealings 33 may be provided.

A pressure transducer 34 is arranged in the lower ring 30 in contact with the rubber disc 31.

The function of this embodiment is the same as that of the first embodiment shown in FIG. 1. Reference is accordingly made to the description thereof above. For certain applications the disc-shaped elastic element may give more accurate signals than the sleeve-shaped element of FIG. 1.

I claim:

1. In a load cell system for transmitting a signal indicating an exerted force, comprising a housing, a rod which extends into said housing, an elastic element disposed between the housing and rod, means for applying a force between the rod and housing to compress the elastic element, and a sensor for indicating an applied force signal, the improvement comprising in combination; said elastic element comprising an annular rubber body; an annular compartment for receiving the annular body formed by an annular recess in the housing and a mating annular recess in the rod; a shoulder respectively located on both the housing and the rod to limit axially opposite end positions of the rubber body disposed within said recesses; contact rings arranged between the respective ends of the rubber body and the housing and the rod shoulders respectively with the rubber body confined within the recesses in the housing and rod; thereby to convert forces in the opposite axial directions between the rod and housing to compression forces in the rubber body, and said sensor comprising a pressure responsive device in contact with the rubber body for sensing said compressive forces as a signal depending on the force.

2. A load cell for connection in a brake linkage to transmit a braking force signal indicating forces in the linkage, comprising in combination:

relatively movable coaxially positioned housing and rod members defining by mating recesses in the respective members an annular compartment and having respective coupling means for axially moving the members, an elastic rubber body residing in the compartment, means for compressing the elastic rubber body in the compartment in response to braking forces when the rod and housing members move in opposite axial directions, and pressure responsive sensing means in contact with the rubber body for transmitting said braking force signal in response to compression of the rubber body.

3. The load cell of claim 2 coupled in a brake system linkage for transmitting braking forces.

4. The load cell of claim 3, wherein the brake linkage comprises a disc brake system having a hanger mechanism for applying pads on opposite sides of a disc wherein said load cell is coupled to the hanger mechanism to measure braking force applied to at least one of the pads.

5. The load cell of claim 2 wherein the rubber body is of annular cylindrical shape surrounding the member rod.

6. The load cell of claim 2 wherein the rubber body is of annular disc shape surrounding the rod member.

* * * * *